March 15, 1960
J. KAMENETZKY
2,928,420
APPARATUS FOR USING LIQUIDS
Filed June 21, 1954
3 Sheets-Sheet 1
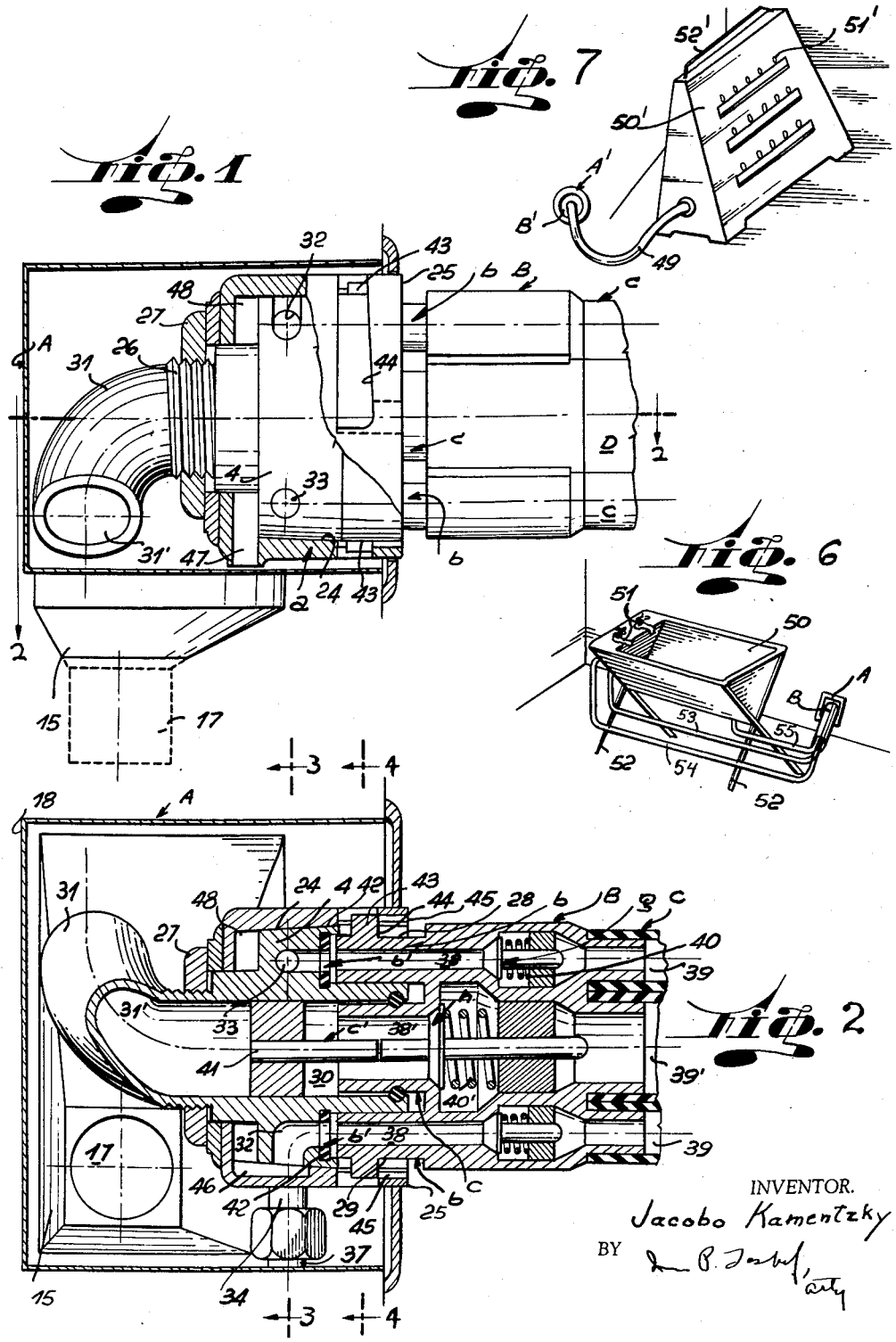
INVENTOR.
Jacobo Kamentzky March 15, 1960   J. KAMENETZKY   2,928,420
APPARATUS FOR USING LIQUIDS
Filed June 21, 1954   3 Sheets-Sheet 2

INVENTOR
Jacobo Kamenetzky
BY
Attorney

March 15, 1960 J. KAMENETZKY 2,928,420
APPARATUS FOR USING LIQUIDS
Filed June 21, 1954 3 Sheets-Sheet 3

INVENTOR
Jacobo Kamenetzky
BY
Attorney

United States Patent Office 2,928,420
Patented Mar. 15, 1960

2,928,420

APPARATUS FOR USING LIQUIDS

Jacobo Kamenetzky, Buenos Aires, Argentina

Application June 21, 1954, Serial No. 438,189

14 Claims. (Cl. 137—595)

The present application is a continuation-in-part of my co-pending application No. 404,099; filed January 14, 1954, now Patent No. 2,856,959.

Said co-pending application No. 404,099 is, in its turn, a continuation-in-part of my copending application No. 150,583; filed March 20, 1950, now abandoned.

The present invention is directed to a connecting device for use with fluids and more particularly to a connecting device having a socket portion and a plug portion, the socket portion being adapted to be secured to a part of a building or other structure having a circulating fluid system, the plug portion being adapted to be connected to an appliance or other device for utilizing the circulating fluid.

In accordance with the present invention, the plug portion and socket portion are formed with co-acting members which inter-engage when the plug portion is inserted within the said socket. When the plug is inserted within the socket and the plug is rotated relative to the socket the co-acting members inter-engage and advance the plug within the socket to provide a fluid tight connection between the conduit or conduits of the plug portion and the corresponding conduit or conduits in the socket portion.

According to the preferred construction the present invention is directed to a valve coupling comprising a socket portion, including a valve casing having a side wall, at least one fluid supply conduit communicating with the valve casing, the side wall forming a plug-receiving cavity, and a closure member rotatably mounted in said cavity between open and closed positions, said closure member having at least one connecting conduit therethrough, said connecting conduit having a first and a second end, said first end communicating with said supply conduit only when said closure member is in the open position; and a removable plug portion insertable in said second end, said plug portion including at least one conduit for communicating with said second end of said connecting conduit in said closure member, said side wall and said plug portion being formed with co-acting members which inter-engage to advance said plug portion within said second end upon insertion of said plug into said second end and upon relative rotation between said plug portion and said socket portion to provide a fluid type connection between said conduit in said plug portion and said second end of said connecting conduit and means on said plug portion to inter-engage said closure member to rotate said closure member to provide communication between said fluid supply conduit and said first end of said connecting conduit only when said closure member is in the open position and thereby provide communication between said fluid supply conduit and said conduit in said plug portion.

Furthermore, in the preferred construction, the co-acting members comprise a slot and projection engageable in the slot, the slot being preferably a helical slot. By providing co-acting members having such a construction the fluid pressure in the conduits cannot serve to displace the plug out of fluid type connection with the socket. In other words, the fluid pressure does not produce a force component sufficiently strong to overcome the friction maintaining the plug in the socket.

According to the invention the plug and socket may comprise one or more fluid conduits depending upon the use to which the connection is to be put. This connection may be used with any type of fluid such as water, steam or gas.

One of the objects of the present invention is to provide a valve coupling or connecting device for fluids, said device consisting of a plug portion and a socket portion so constructed that the fluid pressure cannot force the plug out of the socket.

It is a further object to provide a valve connection having a plug portion and a socket portion, one of said portions being connectable to a building or other source of fluid while the other portion is connectable to a portable appliance.

It is a further object of the present invention to provide a connecting device or valve coupling having a plug portion and a socket portion wherein the plug portion is insertable within the socket portion utilizing only one hand.

These and other objects will become readily apparent from the following detailed description of preferred embodiments of the present invention as illustrated in the annexed drawings wherein:

Fig. 1 is a side view partially in section showing a plug and socket of the present invention with the plug and socket in the final coupled position.

Fig. 2 is a section taken along the line 2—2 of the device shown in Fig. 1, but with the plug being shown during insertion and before rotation thereof.

Fig. 6 shows an application of the connection or coupling of the present invention as used with a portable bathtub.

Fig. 7 shows an application of the connection or coupling of the present invention as used with a portable gas device.

Throughout the several figures, the same reference numerals have been used to designate the same or corresponding parts.

Figure 3:
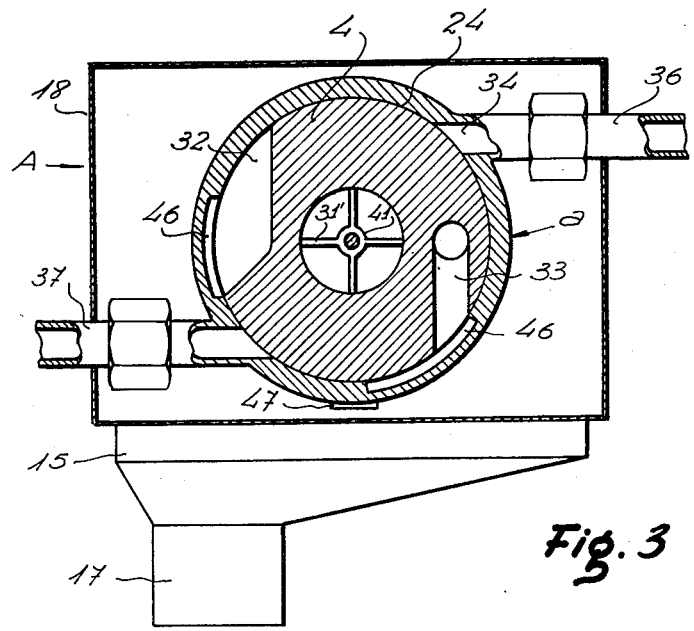
Fig. 3 is a section taken on line 3—3 of the device of Fig. 2.

Referring to Figs. 1-4 the coupling of the present invention comprises a socket A adapted to be connected to the fluid supply source of the system. This socket may be rigidly connected in the wall of a building or other equivalent location. A plug B is provided, the plug being connected to a device utilizing the fluid of the fluid system. Each of the plug and socket is provided with at least one corresponding conduit so that when the plug is inserted within the socket the respective conduits are connected in a fluid tight manner.

The valve casing $a$ of socket A has a side wall forming a conical cavity 24 having a front opening 25. Within the cavity 24 a rotating closure member 4 is mounted, which has a coaxial pipe portion 26 integral with or rigidly secured to the same, extending through an opening in the bottom of said cavity, and projecting out of the back portion of the socket core at its furthest end. A nut 27 secures the closure member 4 in said cavity without hindering its free partial rotation between two boundary positions.

The closure member 4 can also have the shape of a cylinder, or any other shape capable of operative rotation; and displays three insertion bores 28, 29 and 30 for corresponding pins in plugs b and c, defined by one hole each, parallel to each other and to the rotation axis of said closure member. Bore 30 is coaxial to pipe portion 26, communicating with conduit 31' of an elbow 31. The other two bores 28 and 29 communicate with one each of conduits 32 and 33, capable of being related to, or aligned with, conduits 34 and 35, respectively, of said valve casing a, communicating with respective nozzles 36 and 37 connecting with the two fluid supplying networks.

Each one of said pins b defines a conduit 38 abutting at one of its ends in the interconnecting hole b', and, at the other, in the conduit 39 of a flexible pipe C, not forming part of the device. In the same way, pin c defines conduit 38', terminating at one of its ends in a hole c', and, at the other in conduit 39' of a flexible pipe D. Conduits 38 each include one check valve g designed to prevent back flow of water in the flexible pipes 39 when the plug is uncoupled. Said valves g are held in closing position, when the plug is uncoupled, by means of springs 40. For the same purpose conduit 38' includes check valve h to prevent back flow of the residual water in the flexible pipe 39' when the plug is uncoupled. Within the bore 30, a driving arm 41, for opening valve h, is located, integral with or rigidly secured to the closure member 4. Valve h, like valves g, is provided with a spring 40' for the same purpose. In addition, bores 28 and 29 are each provided with a resilient packing 42.

The plug B is capable of being coupled to the socket A, in linkage with its valve casing a, by means of a threaded joint, established with projections 43 of pins b, and which are linked to the corresponding helicoidal edges 44 of the valve casing a, after running through slots 45 of said valve casing and slots 45a of the closure member 4. The valve casing a is confined within casing 18, which has at its bottom a collecting container 15 designed to receive the liquid flowing from elbow 31. Container 15 is provided, in its turn, with a drain 17 capable of being connected to the liquid receiving network. The spacing of elbow 31 from container 15 serves to interrupt the draining circuit to prevent contamination.

Chambers 46 (see Figs. 1-3), together with chamber 47 form a draining circuit for the residual water in the interconnected connecting organs.

Figure 4:
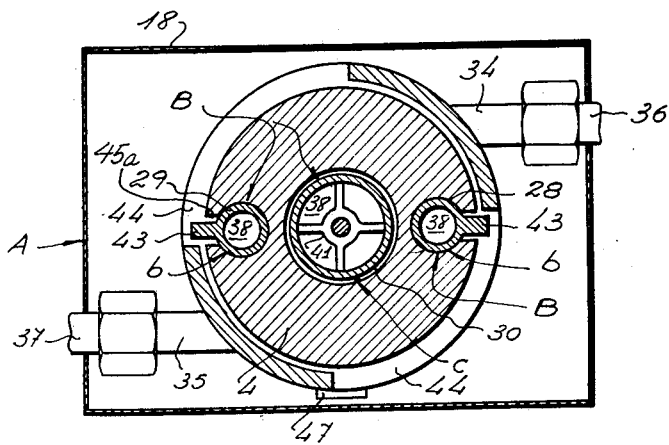
Fig. 4 is a section taken along the line 4—4 of the device of Fig. 2.

The device shown in Figs. 1-4 is used as follows: The operator grips with one hand plug B, and, keeping in a horizontal position the imaginary plane containing the axis of the three pins, inserts same into the corresponding bores of the closure member 4, seeing to it that the edges 43 of such pins correspond with slots 45 of the valve casing a, exactly as it is shown in Figures 2-4. After a clockwise fourth of a turn, given by the operator to the plug he is gripping with a single hand, the plug goes to position seen in Figure 1, in which, conduit 32 of the closure member 4 is connected to conduit 34 of the valve casing; conduit 33 of the closure member is connected to conduit 35 of the valve casing; and chambers 46 of the valve casing are isolated relative to conduits 32 and 33 of the closure member. Thus, the closure member 4 has been displaced to the opening position of the conduits, and the plug has been coupled. However, communication between the elbow 31 and the collector has not changed.

Valves g belonging to pins b are open due to the fluid pressure; and valve h belonging to pin c opens due to the reaction of the arm 41. The opening and closing of valves g and h could be performed mechanically, the fluid pressure and the spring not being necessary. The connection of the conduits of pins b and the respective conduit of the socket is made by means of juxtaposition of their ends through the packings 42.

To uncouple the plug, the operator gives it a counterclockwise fourth of a turn; and the closure member goes back to its closing position relative to the conduits 34 and 35; and conduits 32 and 33 (see Fig. 3) are connected with chambers 46, through which drains the residual liquid in pins and bores towards conduit 47 through chamber 48, thus dropping into collector 15. In this manner, the edges 43 of pins b are again coincident with slots 45 of the valve casing a, and the operator can withdraw the plug from the socket and, in so doing, closes the valves, as the pressure of the driving arm 41 ceases to actuate.

Collector 15 can project towards the outside of the front part of the valve casing a, with the purpose of receiving the dripping from the mouth of the bolts.

In the illustrated embodiment the guide between the plug and the valve casing is helical. This multiplies the force of the operator to effect a tight juxtaposition between the inter-connected openings of the plug and socket conduits. The angle between the direction of the edges and that of the axis of the openings is nearer to 90° than 0°. This prevents the force of the fluid pressure from forcing the plug out of the socket. Multiplication of the juxtaposition force can also be obtained by means such as a lever by connecting to the plug a lever arm (not shown).

It is apparent that according to the present invention one or more collectors can be used or optionally one single directional valve may be used to prevent return flow of the liquid, or one or more casings or closure members can be used, the different combinations depending upon the use to which the valve coupling of the present invention is to be put.

Figure 5:
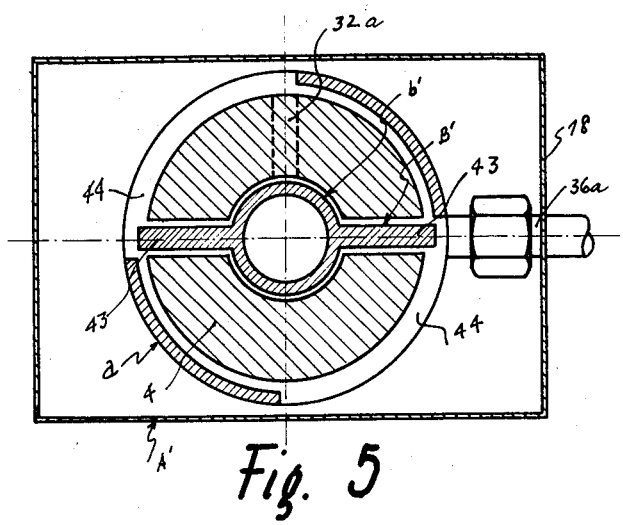
Fig. 5 is a section similar to that of Fig. 4 showing a modification without a return conduit.

Another embodiment of the present invention is illustrated in Fig. 5, showing socket A' and plug B'. In this embodiment the fluid supplied by the fluid supply source is used up in the appliance and no return is necessary. For example, gas may be supplied to a gas burner. This modification is especially useful when, due to the type of fluid (e.g. gas) the maximum of caution must be used, so that the failure of one spring would not bring about a defective closure of the closure member when the plug is uncoupled.

In Fig. 5 the three pins b and c are reduced to one single pin b'; the conduits 32 and 33 to one single conduit 32a, the drawing of which is made with dotted lines, and conduits 36 and 37 to one single supplying conduit 36a. The helicoidal flanges 44, the edges 43, the closure member 4, the valve casing a, etc., are similar to the ones illustrated. The opening is performed by the fourth of a turn until conduits 32a and 36a are made coincident, and, reciprocally, the closing and uncoupling. (The check valve g or h has been omitted, but, optionally, another valve could be included.

In Fig. 6 there is shown a system utilizing the valve coupling of the present invention. More particularly, Fig. 6 shows a system in which provision is made for supplying water from two sources and returning the used water to the socket. The appliance in this figure is a bathtub 50 having foldable legs 52 which render the bathtub portable. A socket A is connected to the building and a plug B is inserted in the socket. The plug has three flexible hoses or conduits 53, 54 and 55 connected thereto. The hoses 53 and 54 are connected to the hot and cold water taps 51 and supply water to the bathtub. The hose 55 is connected to the drain of the bathtub and drains the water into the collector of the socket.

Figure 7 shows a system complementary to an installation for supplying to a building a fluid which is not desired to be returned, such as for instance a combustible gas. The gas stove 50' is provided with means 52' for rendering the same movable and is connected through a flexible pipe 49 to one B' of two parts B', A' which may be coupled one to another, of a device of the type comprising two parts able to be coupled together and to open at least one valve contained in at least one of them automatically upon insertion of one part such as plug B' and to close said valve automatically upon removal of said parts. The other part A' forms part of the permanent system. The pipe 49 supplies gas to gas burners 51'. The connecting device may be the device herein described (Fig. 5) or may be of any other suitable construction. The appliance shown as gas stove 50' may be any other appliance or device such as for instance a gas-actuated iron destined to be employed instead of the conventional electric irons.

Figure 8:
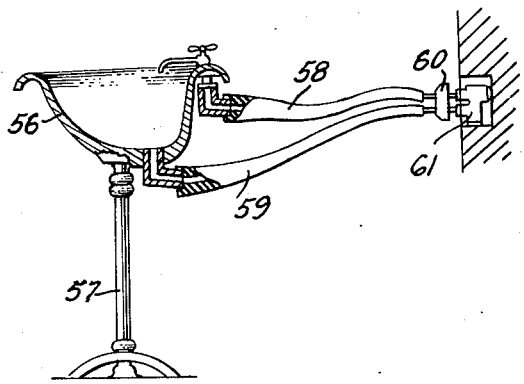
Fig. 8 shows an application of the connection or coupling of the present invention as used with a portable wash-stand.

Figure 8 shows a simplified arrangement for a lavatory 56 provided with the means 57 for rendering the same movable. Said arrangement comprises one duct 58 for supplying a liquid to a tap and a separate duct 59 connected to the check valve of the lavatory. The ducts 58 and 59 are connected to the plug 60, which is insertable in the socket 61.

When referring exclusively to liquids, gas or steam, throughout the present application, it only means that said reference only deals with a mere example or an application preferable in connection with such type of fluid or condition of same, but it must be understood that said example or application may be used in connection with any other type or condition of the fluid, provided the design of the device allows to do so, or adding the variations or simplifications resultant of the means described in this present application. The term "building installation" and derivative or similar expressions involve every installation or adherence respective of a wall, whether it belongs to a building or not, being possible that it belongs to a ship, a train, an aircraft, etc. Also, any reference to "appliances" for the use of fluids involves "apparatus" designed for the same use, and vice versa. In the same manner, the words "supplying" and others derivating thereof have the same meaning as "feeding" and derivative words. Also, the expression "connecting organ" has the same meaning as the word "interconnector."

When, due to low fluid pressure, there is no fear that the plug will be driven out, it is not necessary to make special provision to prevent the fluid pressure from forcing the plug out of the socket. Of course, this does not mean that there can be eliminated simple means to keep the plug in the socket since it is necessary to avoid accidental uncoupling of the plug by means of the operator of the appliance. Furthermore, when the fluid supplied to the appliance must be clean, it will be necessary to include provision for the free flow of fluid by the action of gravity to prevent used water from flowing back toward the parts of the appliance which must be kept in a good condition of cleanliness.

In addition to everything stated before, it is obvious that, when putting into execution the present invention, alterations or improvements could be introduced, as refers certain construction details and forms, provided that same do not deviate from the fundamental principles specified in the following claims:

What I claim is:

1. A valve coupling comprising a socket portion, said socket portion including a valve casing having a side wall, at least one fluid supply conduit communicating with said valve casing, said side wall forming a plug receiving cavity, and a closure member rotatably mounted in said cavity between open and closed positions, said closure member having at least one connecting conduit therethrough, said connecting conduit having a first end and a second end, said first end communicating with said supply conduit only when said closure member is in the open position; and a removable plug portion insertable in said second end, said plug portion including at least one conduit for communicating with said second end of said connecting conduit in said closure member, said side wall and said plug portion being formed with coacting members which interengage to advance said plug portion within said second end upon insertion of said plug into said second end and upon relative rotation between said plug portion and said socket portion to provide a fluid-tight connection between said conduit in said plug portion and said second end of said connecting conduit and means on said plug portion to interengage said closure member to rotate said closure member to provide communication between said fluid supply conduit and said first end of said connecting conduit only when said closure member is in the open position and thereby provide communication between said fluid supply conduit and said conduit in said plug portion.

2. A valve coupling as recited in claim 1 wherein at least a portion of said connecting conduit lies in a plane at an angle to the axis of rotation of said closure member.

3. A valve coupling as recited in claim 2 wherein the closure member has a transverse slot and the means to rotate said closure member comprises a projection on the forward end of said plug portion which engages said slot.

4. A valve coupling as recited in claim 3 wherein said coacting members comprise a helical slot and a projecting means.

5. A valve coupling as recited in claim 3 wherein said coacting members comprise a helical slot and a projecting means, said projecting means being a lateral extension of said previously named projection on the forward end of said plug portion.

6. A valve coupling as recited in claim 1 wherein said socket portion includes a fluid drainage collector, said closure member has a central drainage duct therethrough communicating with said drainage collector, and said plug portion includes a central return duct spaced apart from said conduit in said plug portion.

7. A valve coupling as recited in claim 6 wherein said central return duct has a valve therein and said central drainage duct includes means for opening said valve when said plug portion is inserted in said socket portion.

8. A valve coupling as recited in claim 7 wherein said conduit in said plug portion includes a check valve.

9. A valve coupling as recited in claim 7 wherein at least a portion of said connecting conduit in said closure member lies in a plane at an angle to the axis of rotation of said closure member.

10. A valve coupling as recited in claim 7 wherein said side wall has a recess therein, said supply conduit opening thereinto, the first end of said connecting conduit opening into said recess.

11. A valve coupling comprising a socket portion, said socket portion including a valve casing having a side wall, a plurality of fluid supply conduits communicating with said valve casing, said side wall forming a plug receiving cavity, and a closure member rotatably mounted in said cavity between open and closed positions, said closure member having a central return duct therethrough and a plurality of spaced apart connecting conduits therethrough, said conduits and duct having first and second ends, said first ends of the connecting conduits communicating with said supply conduits only when said closure member is in the open position and said second ends of said duct and connecting conduits terminating in the face of said closure member facing the open end of said cavity said socket portion including a fluid drainage collector communicating with said first end of said central return duct; and a removable plug portion insertable in said socket, said plug portion including at least a central hollow pin and two spaced apart hollow pins, each of said pins constituting the end of a conduit within said plug portion, said side wall and said plug portion being formed with coacting members which interengage to advance said plug portion within said plug receiving cavity upon insertion of said plug into said cavity and upon relative rotation between said plug portion and said socket portion to provide a fluid-tight connection between said pins in said plug portion and said second ends of said connecting conduits and the central return duct whereby said pins on said plug portion interengage said closure member to rotate said closure member to provide communication between said fluid supply conduits and the respective first ends of said connecting conduits only when said closure member is in the open position.

12. A valve coupling as recited in claim 11 wherein at least a portion of each of said connecting conduits in said closure member lies in a plane at an angle to the axis of rotation of said closure member.

13. A valve coupling as recited in claim 12 wherein the conduit of said plug portion which terminates in said central hollow pin has a valve therein and wherein said central return duct of said closure member includes means for opening said valve when said plug portion is inserted in said socket portion.

14. A valve coupling as recited in claim 13 wherein the other conduits in said plug portion have check valves therein.

References Cited in the file of this patent

UNITED STATES PATENTS

| | | |
|---|---|---|
| 562,414 | O'Leary | June 23, 1896 |
| 803,648 | Williams | Nov. 7, 1905 |
| 836,344 | Schumacher | Nov. 20, 1906 |
| 1,062,779 | Hildenbrand | May 27, 1913 |
| 1,182,684 | Howe | May 9, 1916 |
| 1,333,538 | Caudron | Mar. 9, 1920 |
| 2,125,542 | Catterlin | Aug. 2, 1938 |
| 2,518,299 | Fernandez | Aug. 8, 1950 |
| 2,638,916 | Scheiwer | May 19, 1953 |
| 2,693,835 | Lundell | Nov. 9, 1954 |